March 29, 1949.  G. J. KAUDER  2,465,879
PORTABLE SPOT WELDER
Filed Aug. 27, 1948  2 Sheets-Sheet 1
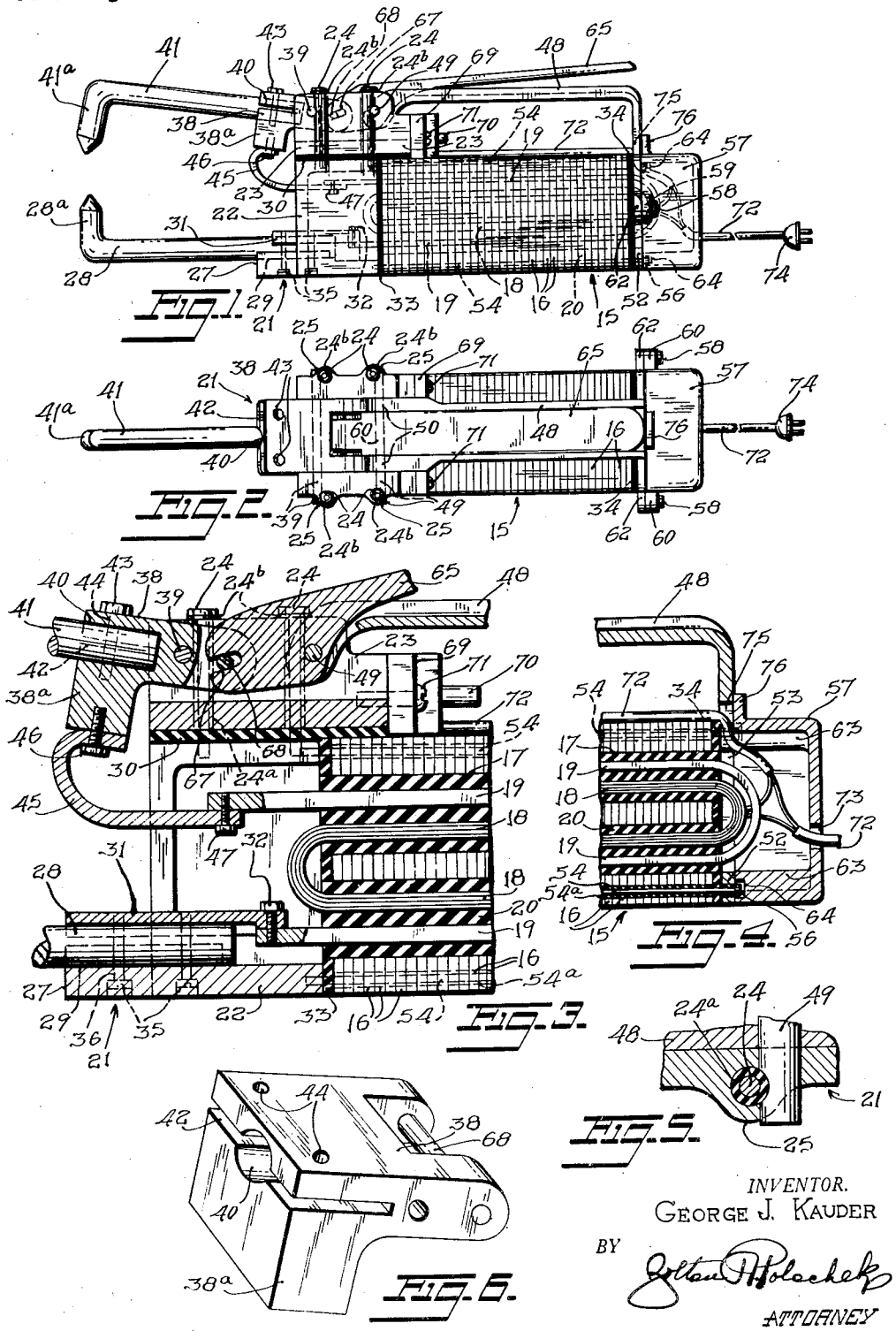
INVENTOR.
GEORGE J. KAUDER
BY
ATTORNEY March 29, 1949. G. J. KAUDER 2,465,879
PORTABLE SPOT WELDER Filed Aug. 27, 1948 2 Sheets-Sheet 2

INVENTOR.
GEORGE J. KAUDER
BY
Zoltan Holochek
ATTORNEY

Patented Mar. 29, 1949

2,465,879

UNITED STATES PATENT OFFICE 2,465,879

PORTABLE SPOT WELDER

George J. Kauder, Brooklyn, N. Y.

Application August 27, 1948, Serial No. 46,419

12 Claims. (Cl. 219—4)

This invention relates to new and useful improvements in a portable spot welder.

More specifically, the present invention relates to new and useful improvements in a portable spot welder characterized by a transformer made up of a plurality of laminations of magnetic material forming the core of the transformer and having a primary winding connected to a source of electrical energy and a secondary winding in the form of a U-shaped piece of conductive material having one end connected to a fixed electrode and the other end connected to a movable electrode in a manner so that the material to be spot welded may be placed between the electrodes and the electrodes moved together to securely grip the material while the welding charge is being passed therethrough.

Still further, the portable welder of the present invention includes a front body consisting of superimposed upper and lower sections fixedly connected together and insulated from each other with the lower section positioned in front of and insulated from the transformer to have the fixed electrode mounted thereon.

Another object of the present invention proposes providing the upper section of the front body with a pivotally mounted nose piece upon which the movable electrode is mounted in a manner to move toward and away from the fixed electrode as the nose piece is pivoted.

A further object of the present invention proposes the provision of a carrying handle having its front end connected to the upper section of the front body by a single pin and formed at its rear end with a depending frame located at the rear end of the transformer and insulated therefrom in a manner so that bolts of non-conductive material may be passed through aligned openings formed in the frame and the transformer and then be threadedly connected with the lower section of the front body so as to securely mount the transformer in position between the frame and the lower section of the front body.

Still another object of the present invention proposes the provision of a dust cap mounted in position on the rear face of the frame of the carrying handle and over the rear end of the transformer and the parts which project therefrom in a manner to cover and protect the same.

A further object of the present invention proposes pivotally mounting a handle on the single pin which pivotally connects the front end of the carrying handle to the front body and which pivotally mounted handle has its front end connected with the nose piece in a manner to pivot the nose piece when the pivotally mounted handle is pivoted.

In accordance with a modification of the present invention it is proposed to provide a means for electrically insulating the fixed electrode from the front body in a manner so as to insure that the device will not short circuit itself when the transformer has been energized.

It is a further object of the present invention to construct a portable spot welder which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure—

Fig. 1 is a side elevational view of the portable spot welder constructed in accordance with the present invention.

Fig. 2 is a plan view of Fig. 1.

Fig. 3 is an enlarged longitudinal vertical sectional view of the front portion of the welder.

Fig. 4 is an enlarged longitudinal vertical sectional view of the rear portion of the welder.

Fig. 5 is an enlarged horizontal sectional view through one of the pivot pins of the upper section of the front body.

Fig. 6 is a perspective view of the nose piece, per se.

Figure 7:
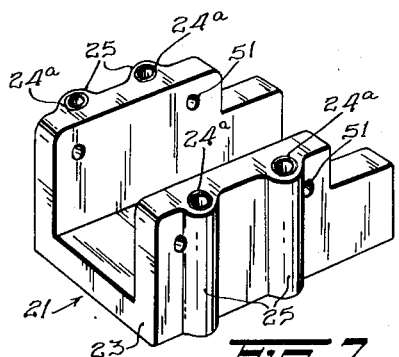
Fig. 7 is a perspective view of the upper section of the front body, per se.

The portable spot welder, according to the present invention, includes a transformer 15 formed of a plurality of adjacent layers 16 of conductive material, forming the core of the transformer. The layers 16 are split longitudinally and formed with adjacent longitudinal grooves 17 in which there is mounted a primary winding 18 and a secondary winding 19. The windings 18 and 19 are insulated from each other and from the layers 16 by suitable insulation material 20, as is generally known in the art. The primary winding 18 is formed of a desired number of turns of wire and the secondary winding 19 is formed of a U-shaped piece of conductive material which has its free ends extended from the front end of the transformer, see Fig. 3

Further details of the construction of the transformer will not be given in this specification as such details are generally known by those skilled in the art and form no part of this invention.

Positioned at the front end of the transformer 15, and insulated therefrom by a piece of insulation 33 on the front end of the transformer 15, there is a front body 21 composed of a lower section 22 and a superimposed upper section 23. These sections 22 and 23 are electrically insulated from each other by an interposed piece of insulation material 30 and are secured together by means of a plurality of bolts 24 which freely pass through bosses 25 formed on the sides of the upper section 23 and which threadedly engage complementary bosses 26 formed on the sides of the lower section 22. As shown in Fig. 7, the lower section 22 is U-shaped in transverse cross-section and has its upper side closed by the bottom face of the upper section 23 and the piece of insulation material 30.

To complete the electrical insulation of the sections 22 and 23, tubular insulation members 24ª are mounted in the bosses 25 of the upper section 23 and through which the bolts 24 extend, and fibre washers 24ᵇ are mounted on the bolts 24 beneath their heads to be clamped against the top face of the upper section 23.

A lip 27 projects forwardly from the bottom portion of the lower section 22 and supports the rear end of a fixedly mounted electrode 28. More particularly, the electrode 28 is circular in cross-section and has its front end 28ª offset upwardly, see Fig. 1. The lip is formed mid-way of its sides with a semi-circular groove 29 in which the rear end of the fixed electrode 28 rests.

A conductor strip 31 formed with a semi-circular bottom face is rested on top of the rear end of the fixed electrode 28 and has its rear end projected beyond the rear end of the electrode 28 and connected to the adjacent end of the secondary winding 19 by a bolt 32, as shown clearly in Fig. 3, so that an electrical current may pass from the end of the secondary winding 19 through the conductor strip 31 and into the rear end of the fixed electrode 28.

Bolts 35 are passed upwards from the bottom face of the lower section 22 of the front body 21 and pass through openings 36 formed in the lower section 22, and threadedly engage the conductor strip 31 securing those parts together with the rear end of the fixed electrode 28 securely clamped between the adjacent faces of the lip 27 and the conductor strip 31.

The upper section 23 of the front body 21 is also U-shaped in transverse cross-section and a nose piece 38 is pivotally supported between the sides of the upper section by a single pin 39. The front of the nose piece 38 is formed with a circular socket opening 40 into which is inserted the rear end of a movable electrode 41. The front end 41ª of the movable electrode 41 is offset downwardly toward the offset end 28ª of the fixed electrode, as shown in Fig. 1. The piece of material to be welded is adapted to be clamped between the offset ends 28ª and 41ª when the movable electrode 41 is pivoted towards the fixed electrode 28.

A transverse slot 42 extends inward from the front end of the nose piece 38 in alignment with the socket opening 40 and a distance equal to the depth of the socket opening 40. Clamp bolts 43 pass through openings 44 formed in the material of the nose piece 38 above the transverse slot 42 and threadedly engage complementary openings formed in the material of the nose piece below the transverse slot 42 to draw the material of the nose piece 38 together to tightly clamp the rear end of the movable electrode 41 in the nose piece 38 to move therewith when pivoted.

The nose piece 38 is formed with a forward depended portion 38ª to which one end of a flexible conductor strip 45 is connected by means of a bolt 46. The other end of the flexible conductor strip 45 is connected to the other end of the U-shaped secondary winding 19 by means of a bolt 47. Thus, current passes from the secondary winding 19 through the conductor strip 45 to the nose piece 38 and then to the movable electrode 41.

A carrying handle 48 has its front end bifurcated and inserted in position between the side walls of the upper section 23 of the front body 21. A single pin 49 has its intermediate portion passing through aligned openings 50 formed in the bifurcated front end of the carrying handle 48 and its ends anchored in openings 51 formed in the sides of the upper section 23.

The pins 39 and 49 are each anchored at their ends against longitudinal displacement by the bolts 24 which secure the sections 22 and 23 of the front body 21 together. This is clearly illustrated in Fig. 5 of the drawings in connection with one end of the pin 49 which secures the end of the carrying handle 48 to the upper section 23 of the front body 21 and which pivotally supports the nose piece pivoting handle as will become clear as this specification proceeds. To accomplish this locking, the pin 49 is mounted in position in the upper section 23 of the front body and the holes for the bolts 24 are then drilled so as to overlap and cut away a portion of the adjacent side of the pin 49. The tubular insulation bushing 24ª is then positioned in the drilled hole and the bolt 24 is threaded into position holding one side of the tubular insulation bushing 24ª in position in the cut away portion of the pin 49 retaining the pin against possible longitudinal movement. Each end of the pin 49 is similarly held, and the ends of the pin 39 are similarly retained in position by the respective insulation bushings 24ª and bolts 24.

The rear end of the carrying handle 48 continues into a rectangular frame 52 corresponding in shape to the transformer 15 and which is located along the rear end of the transformer, and insulated therefrom by a piece of insulation 34 at the rear end of the transformer 15. The frame 52 has a central opening 53 so that the frame 52 extends about the primary winding 18 and the secondary winding 19 where they project from the rear end of the transformer 15. Long bolts 54 pass freely through openings 55 formed in the corners of the frame 52, through the insulation 34 through aligned openings formed in the layers 16 of the transformer 15, through the insulation 33, and threadedly engage complementary openings formed in the lower section 22 of the front body 21 securely mounting the transformer 15 in position between the adjacent faces of the frame 52 of the carrying handle 48 and the lower section 22 of the front body 21. The heads 56 of the long bolts 54 project from the rear face of the frame 52.

Mounted within the openings of the transformer 15 through which the bolts 54 extend, there are tubular sleeves 54ᵃ of insulation material for the bolts 54. Similarly, there is mounted in the openings 55 of the frame 52 tubular bushings 54ᵇ of insulation material completing the insulation of the bolts 54 from the transformer 15 and the carrying handle 48. The tubular bushings 54ᵇ are of a diameter greater than the diameter of the heads 56 of the bolts 54 to insure that no portion of the heads 56 will engage the frame 52.

Figure 8:
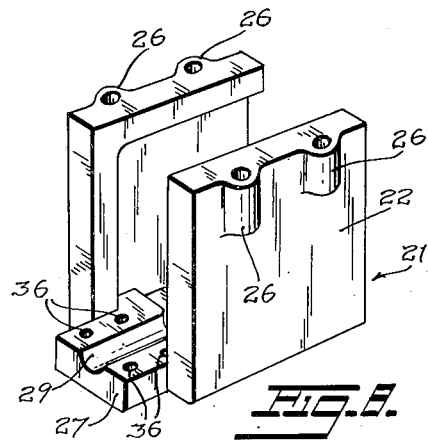
Fig. 8 is a perspective view of the lower section of the front body, per se.
Figure 9:
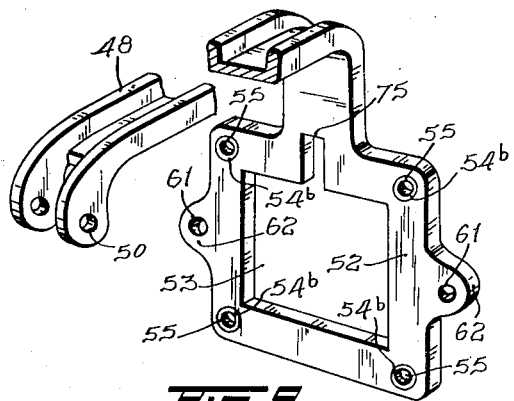
Fig. 9 is a perspective view of the carrying handle, per se.
Figure 10:
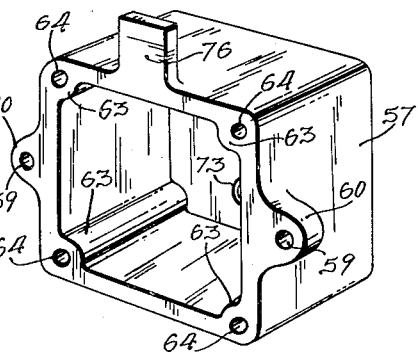
Fig. 10 is a perspective view of the rear dust cap, per se.
Figure 12:
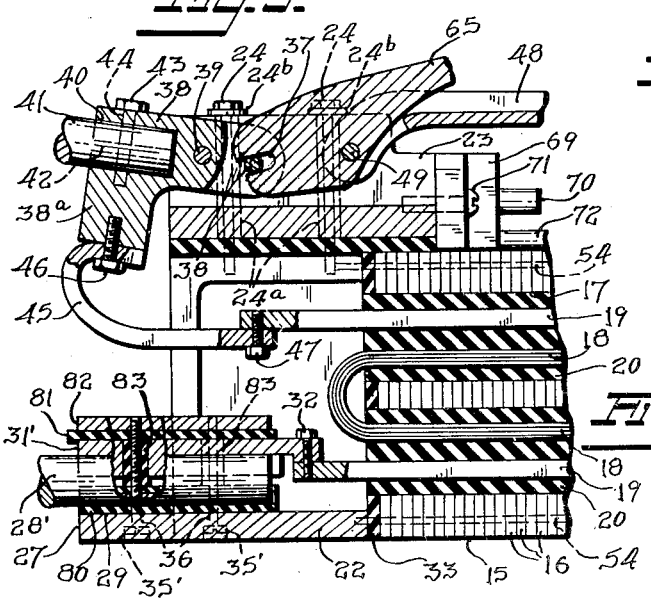
Fig. 12 is an enlarged longitudinal vertical sectional view similar to Fig. 3, but illustrating the front portion of the welder constructed in accordance with a modification of the present invention.

A dust cap 57 is positioned over the back face of the frame 52 and is secured to the frame 52 by bolts 58 which pass freely through openings 59 formed in ears 60 which extend from the sides of the dust cap 57 and which threadedly engage complementary openings 61 formed in ears 62 which extend from the sides of the frame 52. The ears 60 and 62 are in alignment and project from diametrically opposite sides of the dust cap 57 and the frame 52 as shown in Figs. 8 and 9.

Internally, the dust cap 57 is formed with inwardly extending bosses 63 formed with enlarged holes 64 into which the heads 56 of the long bolts 54 extend covering those heads and permitting the frame 52 and the dust cap 57 to be secured together in intimate facial contact with each other. The holes 64 are of a sufficiently large size to engage about the heads 56 so that the cap 57 will make no electrical contact therewith.

The top portion of the carrying handle 48 is channel shaped and extends parallel to the top face of the transformer 15. A nose piece pivoting handle 65 has an intermediate portion inserted into the bifurcated front end of the carrying handle 48 and that intermediate portion of the pivoting handle 65 is formed with an opening 66 through which an intermediate portion of the pin 49 passes for pivotally supporting the pivoting handle 65. The front end of the pivoting handle 65 is formed with a slot 67 extended in from the front thereof and which receives a pin 68 mounted across the back of the nose piece 38 for causing the nose piece 38 to be pivoted when the handle 65 is pivoted. The rear portion of the pivoting handle 65 corresponds in width to the space in the top face of the channel-shaped top portion of the carrying handle 48, see Fig. 2, so that the rear end of the pivoting handle 65 will be received in the carrying handle 48 when the pivoting handle 65 is pivoted about the pin 49 towards the carrying handle 48.

A normally open switch 69 having a manually depressible button 70 is mounted upon the rear face of the upper section 23 of the front body 21 beneath the carrying handle 48, by several screws 71. Electrical leads 72 enter the dust cap 57 through an opening 73 formed in the rear wall thereof. These leads 72 connect the primary winding 18 of the transformer 15 in series with the switch 69 and a plug 74 which is adapted to be inserted into the usual plug receptacle or other source of electrical energy, to cause the transformer 15 and in turn the electrodes 28 and 41 to be energized when the button 70 of the switch 69 is pushed inwards closing the switch 69.

The top portion of the frame 52 is formed with an upwardly extending slot 75, see Figs. 4 and 8, which has its top end disposed above the top face of the transformer 15, so that portions of the leads 72 may be extended upward through the slot 75 and then along the top face of the transformer 15 to be connected to the switch 69. The open rear side of the slot 75 is closed by a lug 76 which projects upward from the dust cap 57, as shown in Fig. 4.

The welder when rested on an all metal surface, while effecting a spot weld, may short circuit itself when the switch 69 is closed to energize the transformer 15. However, this objection can be overcome by mounting a piece of insulation material across the entire bottom of the device. For example, a sheet of soft rubber may be adhesively secured to the bottom face of the welder.

Figure 11:
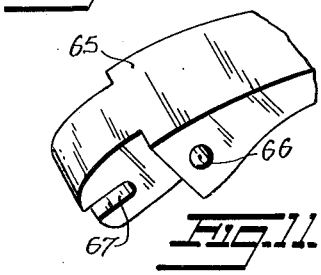
Fig. 11 is a perspective view of the front end of the handle, per se, for pivoting the nose piece.

In accordance with the modification of the present invention shown in Fig. 11, the construction of the electric spot welder is similar to that previously illustrated except for the mounting of the fixed electrode 28'. In this modified mounting of the fixed electrode 28', a piece of insulation material 80 lines the groove 29 of the lip 27 of the lower section 22 of the front body 21. Thus, the piece of insulation material electrically insulates the rear end of the electrode 28' from the lower section 22 of the front body.

The conductor strip 31' rests on the top of the rear end of the fixed electrode 28' and has its rear end connected to the one end of the secondary winding 19 of the transformer 15 by the bolt 32. A piece of insulation material 81 is rested on the top face of the conductor strip 31' and a clamp plate 82 rests on the top face of the piece of insulation 81.

The bolts 35' are passed upward from the bottom face of the lower section 22 of the front body 21 and pass through aligned openings 36 formed in the lower section 22, the insulation material 80, the conductor strip 31', the insulation material 81 and threadedly engage complementary openings formed in the clamp plate 82, securing those parts together with the rear end of the fixed electrode 28' clamped in position between the adjacent faces of the piece of insulation material 80 and the conductor strip 31'.

To complete the insulation of the fixed electrode 28', the bolts 35' pass through tubular members 83 mounted in the conductor strip 31'. The tubular members 83 are of a length slightly greater than the thickness of the conductor strip 31' so that the ends of the tubular members contact the adjacent faces of the pieces of insulation material 80 and 81.

This mounting of the rear end of the fixed electrode 28' completely insulates the rear end of the electrode from the front body 21 and eliminates the possibility of the welder short circuiting itself when rested on an all metal surface while effecting a spot weld.

In other respects this form of the invention is similar to that disclosed in connection with the first form of the invention and like reference numerals are used to identify like parts in each of the several views.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts.

2. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, said connection of said front body sections comprising bolts passing freely through insulated bosses formed on the upper section and threadedly engaging complementary bosses formed on said lower section.

3. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said noise piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, said nose piece being formed with a socket opening extended in from the front end thereof and into which the rear end of the movable electrode is extended and a transverse slot communicating with said socket opening at the sides thereof, and bolts passing through the material of said nose piece above said slot and threadedly engaging the material of said nose piece below said slot.

4. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, said interengaging elements comprising a pin mounted across the rear end of said nose piece and engaged into a complementary slot formed in the front end of said pivotally mounted handle for causing the nose piece to be pivoted when the pivotally mounted handle is pivoted.

5. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, said dust cap being formed in its face adjacent said frame with enlarged holes into which the heads of said bolts engage for covering the heads and permitting the dust cap and frame to be secured together in facial contact.

6. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, aligned ears formed on said dust cap and said frame, and bolts passing through the ears of one part and engaging threaded openings formed in the ears of the other part forming the means securing the dust cap to the frame.

7. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, a manually operable switch mounted on the upper section of said front body beneath said carrying handle, said frame being formed with a slot having its upper end above the top of said transformer so that electrical leads to the switch may be extended upward through said slot and then along the top face of said transformer to said switch, and means closing the open back of said slot.

8. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, a manually operable switch mounted on the upper section of said front body beneath said carrying handle, said frame being formed with a slot having its upper end above the top of said transformer so that electrical leads to the switch may be extended upward through said slot and then along the top face of said transformer to said switch, and means closing the open back of said slot, said slot closing means comprises an upwardly extending lug formed on said dust cap and projected upwardly across the open back of said slot.

9. A portable spot welder comprising a transformer including a primary winding connected to a source of electrical energy and a secondary winding in the form of a U-shaped piece of conductive material having its ends extended from the front end of said transformer, a front body formed of a lower section mounted in position over and insulated from the front end of said transformer and a superimposed upper section secured to and insulated from the lower section, an electrode fixedly mounted on the lower section, and connected to one end of said secondary winding, a nose piece pivotally mounted on the upper section, a movable electrode mounted in position on said nose piece to move therewith toward and away from the fixedly mounted electrode as the nose piece is pivoted, and connected to the other end of said secondary winding, a carrying handle extended parallel to and above said transformer, a pin connecting the front end of said handle to the upper section of said front body, a handle pivotally mounted on said pin, said handle and said nose piece having interengaging elements for pivoting said nose piece, a frame depending from the rear end of said carrying handle and extending along the rear end of said transformer and insulated therefrom, bolts passing through said frame and said transformer and insulated at the end where the carrying handle engages said bolts and threadedly engaging the lower section of said front body, and a dust cap secured in position over the exposed rear face of said frame and the heads of said bolts.

10. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin and engaging said nose piece for pivoting the same when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, and a pin mounted across said nose piece adjacent the rear end thereof and said nose piece pivoting handle being formed with a slot into which said pin extends for connecting said nose piece to said pivoting handle to cause said nose piece to be pivoted when said handle is pivoted.

11. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, said nose piece being pivotally supported on a pin extended transversely across said upper section parallel to said first-mentioned pin, and vertically disposed bolts connecting said sections together and engaging said pins for retaining them against possible longitudinal displacement.

12. In a portable spot welder having a transformer including a primary winding connected to a source of electrical energy and a secondary winding in the form of a U-shaped piece of conductive material with a fixed electrode connected to one end of the secondary winding and a movable electrode connected to the other end of the secondary winding, a front body formed of superimposed upper and lower sections insulated from each other and fixedly connected together, said lower section of said body being positioned at the front end of the transformer and insulated therefrom and having the fixed electrode mounted thereon, a nose piece pivotally mounted on the upper section of said front body and supporting the movable electrode to move toward and away from the fixed electrode as said nose piece is pivoted, a carrying handle extended parallel to and above the transformer, a pin connecting the front end of said carrying handle to the upper section of said front body, a handle pivotally mounted on said pin, said handle and said nose piece having inter-engaging elements for pivoting said nose piece when said pivotally mounted handle is pivoted, a frame integrally formed with and depending from the rear end of said carrying handle and extending along and insulated from the rear end of the transformer, bolts passing through said frame and the transformer and insulated at the end where the handle engages said bolts threadedly engaging the lower section of said front body, and a dust cap secured in position over the exposed rear face of said frame and the heads of said bolts, said nose piece being pivotally supported on a pin extended transversely across said upper section parallel to said first-mentioned pin, and vertically disposed bolts connecting said sections together and engaging said pins for retaining them against possible longitudinal displacement, said pins having rounded cutaway portions arranged concentric with the holes of said upper section through which said bolts pass to engage about the sides of said bolts and secure the pins against longitudinal displacement.

GEORGE J. KAUDER.

REFERENCES CITED

The following references are of record in the file of this patent:

UNITED STATES PATENTS

| Number | Name | Date |
|---|---|---|
| 2,211,551 | Winkler | Aug. 13, 1940 |
| 2,256,028 | Jardine et al. | Sept. 16, 1941 |
| 2,402,004 | Adams | June 11, 1946 |
| 2,441,438 | Mulder | May 11, 1948 |